(12) United States Patent
Scherer

(10) Patent No.: US 8,182,776 B2
(45) Date of Patent: May 22, 2012

(54) PROCESS FOR OPERATING A FOSSIL FUEL FIRED POWER PLANT

(75) Inventor: Bruce Edward Scherer, Toledo, OH (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 107 days.

(21) Appl. No.: 12/853,626

(22) Filed: Aug. 10, 2010

(65) Prior Publication Data

US 2012/0037056 A1 Feb. 16, 2012

(51) Int. Cl.
*B01D 53/34* (2006.01)
*B01D 53/50* (2006.01)
*B01D 53/56* (2006.01)
*B01D 53/64* (2006.01)

(52) U.S. Cl. ............... 423/210; 423/235; 423/239.1; 423/243.01; 423/215.5

(58) Field of Classification Search ............ 423/210, 423/235, 239.1, 243.01, 215.5
See application file for complete search history.

(56) References Cited

U.S. PATENT DOCUMENTS

| | | | |
|---|---|---|---|
| 3,953,578 A | 4/1976 | Thirion | |
| 3,991,167 A * | 11/1976 | Depommier et al. | 423/393 |
| 4,772,458 A | 9/1988 | Gosser et al. | |
| 4,832,938 A | 5/1989 | Gosser et al. | |
| 5,194,242 A | 3/1993 | Paoli | |
| 6,676,912 B1 | 1/2004 | Cooper et al. | |
| 6,955,799 B1 | 10/2005 | Parrish | |
| 2008/0241030 A1 * | 10/2008 | Parrish et al. | 423/109 |
| 2010/0015021 A1 * | 1/2010 | Johnsgard et al. | 423/210 |

OTHER PUBLICATIONS

Deed, Terry; "The Manufacture of Hydrogen Peroxide"; accessed May 7, 2010; Internet Article; http://nzic.org.nz/ChemProcesses/production/1E.pdf.

McCormick, A. Tofa; "A Comparison of Online Backpass Cleaning Technologies: Acoustic and Conventional Steam or Air Sootblowing"; Jun. 2007; vol. 2, Issue 7; Energy Central Topic Centers; Aurora, CO.

Esdale, Bradkey and Truce, Rod; "The Indigo MAPSystem"; accessed Jan. 6, 2010; Internet Article; www.indigotechnologies.com.au; Milton, Australia.

* cited by examiner

*Primary Examiner* — Timothy Vanoy
(74) *Attorney, Agent, or Firm* — Curatolo Sidoti Co., LPA; Joseph G. Curatolo; Vincent A. Cortese

(57) ABSTRACT

An integrated process for operating a fossil fuel fired power plant including: producing hydrogen gas and an aqueous solution of hydrogen peroxide via a process including: dissociating hydrogen gas and oxygen gas from water; pressurizing the hydrogen gas and the oxygen gas; and mixing, under pressure, the oxygen gas and at least about a stoichiometric portion of the hydrogen gas with an aqueous solution of a catalyst and a promoter to form the aqueous solution of hydrogen peroxide; supplying a remainder of the hydrogen gas to at least one of (a) a storage means, (b) a boiler detonation cleaning system of the fossil fuel fired power plant, and (c) an electrical generator of the fossil fuel fired power plant; and injecting the aqueous solution of hydrogen peroxide into an air pollution control system of the fossil fuel fired power plant.

20 Claims, 1 Drawing Sheet

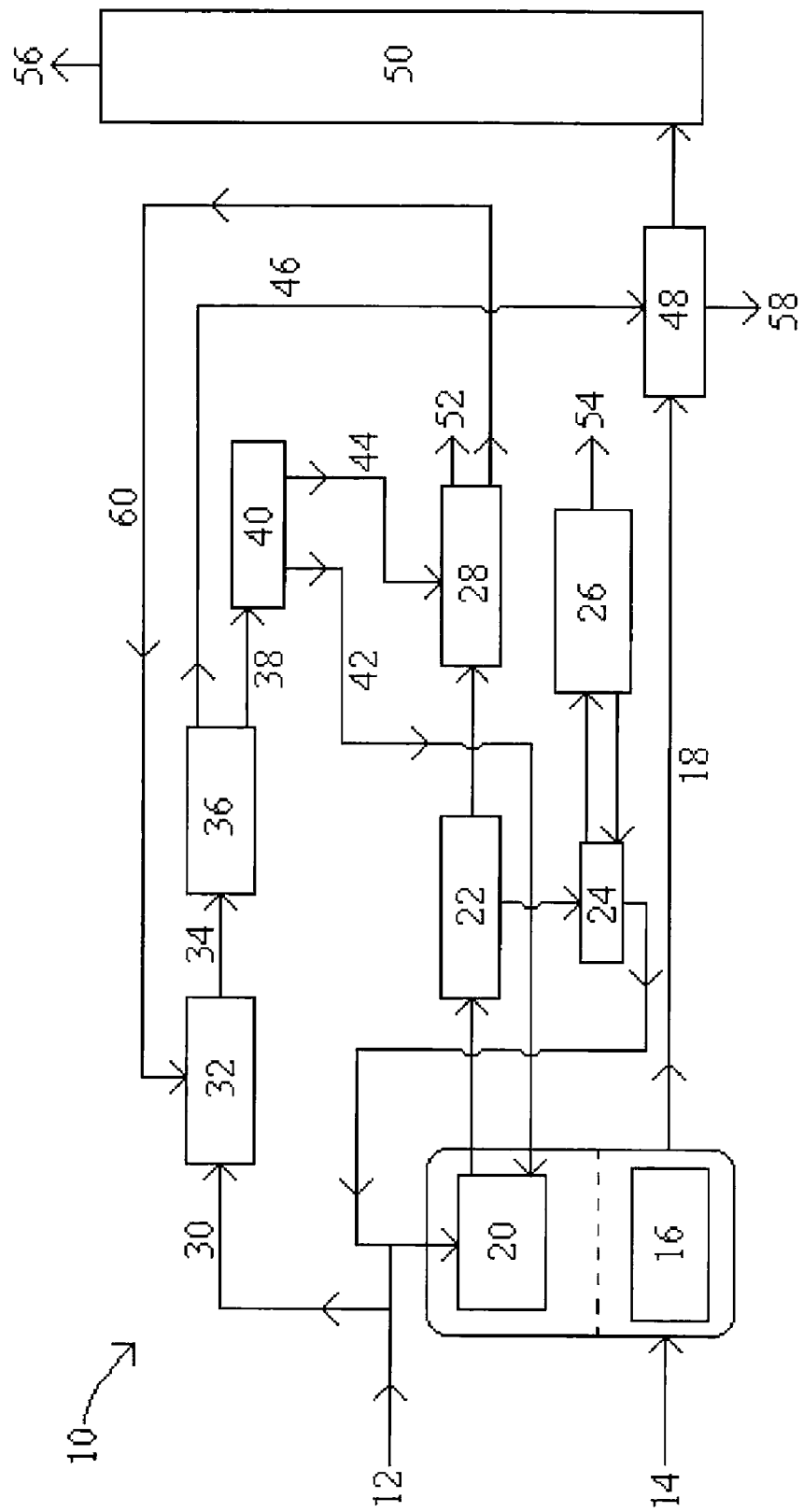

PROCESS FOR OPERATING A FOSSIL FUEL FIRED POWER PLANT

Hydrogen and oxygen gases are dissociated from water and used to produce an aqueous solution of hydrogen peroxide, which is utilized in an air pollution control system of a fossil fuel fired power plant. Excess hydrogen gas can be stored or may be used in a boiler detonation cleaning system or as the atmosphere within the shell of the power plant's main electrical generator(s).

In a fossil fuel fired power plant, the chemical energy stored in a fossil fuel (such as coal, fuel oil, natural gas, or oil shale, among others), and the oxygen with which it is burned, is converted successively into thermal energy, mechanical energy, and electrical energy. The fossil fuel is burned to create thermal energy, which is used to boil feed water into steam. The steam is used to turn a series of turbines, converting the thermal energy of the steam into mechanical energy. The turbines share a common shaft with an electrical generator, which converts the mechanical energy of the moving turbines into electrical energy.

The electrical generator comprises a stationary stator and a spinning rotor, which is spun by the common shaft. The rotor spins in a sealed chamber (shell) cooled with hydrogen gas, selected because it has the highest known heat transfer coefficient of any gas and for its low viscosity, which reduces "windage" losses. Because the hydrogen gas within the sealed chamber needs to be continuously replaced, hydrogen gas must be stored at the fossil fuel fired power plant. The hydrogen gas must also be transported to the power plant. Because of the explosive nature of hydrogen gas, safety matters must be considered, often at substantial cost to the operator of the fossil fuel fired power plant.

Burning fossil fuels creates numerous byproducts which must be dealt with in the fossil fuel fired power plant. First, burning fossil fuels creates ash, which can create a residue on the exterior surface of the conduits used to transfer heat from the burning fossil fuel to the feed water. This results in reduced efficiency of the heat transfer process, and the ash must therefore be removed from time to time.

This may be done by a process called detonation soot blowing. The detonation soot blower is comprised of a combustion chamber, engaged, such as by piping, to the convective section or chamber of the boiler in the fossil fuel fired power plant. The detonation combustion chamber is charged with fuel and the fuel is ignited, resulting in a detonation shock wave which dislodges the ash from the exterior surfaces of the conduits. Propane is currently the fuel of choice, and is typically supplied to the fossil fuel power plant from an external source. For this reason, and also because igniting propane requires pure oxygen, propane can be expensive and complicated to use for detonation soot blowing.

Second, burning fossil fuels creates byproducts, such as nitrogen oxides, sulfur oxides, mercury, and particulate materials, which are present in the exhaust stream of the burning process. These byproducts are environmentally undesirable, and therefore must be at least partially removed from the exhaust stream before the exhaust stream is sent to the external environment. This process is colloquially referred to as "scrubbing". Some or all of these byproducts may be removed by various scrubbing processes which oxidize, then adsorb the byproducts in order to remove them from the exhaust stream.

One oxidizing agent which has been considered for use in modern scrubbing processes is hydrogen peroxide. A typical method of producing hydrogen peroxide is the anthraquinone process, also known as the aquinone process, which is very expensive, limiting the potential uses of hydrogen peroxide. Hydrogen peroxide produced via the aquinone process is produced off-site and shipped to the fossil fuel fired power plant for use. Because hydrogen peroxide is explosive at concentrations above about 70% in water, shipping costs per unit of hydrogen peroxide may be high. The increasing costs of hydrogen peroxide, and its increasing demand in modern fossil fuel fired power plants due to increasing emissions control standards, can be difficult for operators of fossil fuel fired plants to bear. Reducing the cost of hydrogen peroxide has the potential to allow smaller fossil fuel power plants to economically make use of this reagent, allowing them to continue to operate.

What is needed is a process for operating a fossil fuel fired power plant which is capable of, in part, providing hydrogen gas and hydrogen peroxide safely, cost effectively, and efficiently.

FIG. 1 is a flowchart showing one embodiment of the present integrated process.

Provided is an integrated process for operating a fossil fuel fired power plant which includes producing hydrogen gas and hydrogen peroxide. The hydrogen gas may be stored for later use, may be used in a boiler detonation cleaning system of the fossil fuel fired power plant, and/or may be supplied to an electrical generator of the fossil fuel fired power plant. The hydrogen peroxide may be used in an air pollution control system of the fossil fuel fired power plant. Using hydrogen gas and hydrogen peroxide produced by the present process may substantially increase the efficiency of the fossil fuel fired power plant and/or decrease the operating costs of the fossil fuel fired power plant. In order to further increase efficiency and reduce costs, the hydrogen gas and hydrogen peroxide may be produced on-site at the fossil fuel fired power plant.

The hydrogen peroxide of the present process is created by first dissociating hydrogen gas and oxygen gas from water. Many methods of dissociation are known, such as dissociation by irradiation or electrolysis. Without limitation, in the present process, the method of dissociation may be electrolysis.

Electrolysis is performed by placing two electrodes, such as conductive metal plates, into a body of water, such as deionized water. When an electrical current is provided to the electrodes, hydrogen gas will accumulate at the negatively charged electrode (the cathode) and oxygen gas will accumulate at the positively charged electrode (the anode). In ideal or near-ideal situations, the amount of hydrogen gas produced will be about double the amount of oxygen gas produced, on a molar basis. In certain embodiments of the present process, deionized water may be provided from the boiler make-up water supply, and, at the rates needed for the present process, the lost deionized water from electrolysis is of an inconsequential amount with regard to the amount of water needed for boiler make-up. The fossil fuel fired power plant may provide the electricity required for the electrolysis process, and, in certain embodiments, approximately 1 MW-hr of electrical power for each 100 $MW_n$ (net megawatts) of electrical production capacity is needed for electrolysis. Hydrogen gas and oxygen gas may be dissociated from water at a combined rate of about 30.4 lb/hr (13.8 kg/hr) for each 100 $MW_n$ of electrical production capacity. As used herein, the unit $MW_n$ refers to the net power produced by the power plant, or the gross unit output ($MW_g$) minus the power used by the power plant.

The hydrogen gas and oxygen gas are then processed into an aqueous solution of hydrogen peroxide, in certain embodiments, via a catalyzed aqueous process. In certain embodiments, the oxygen gas and at least about a stoichiometric portion of the hydrogen gas are pressurized to 1,500 psig (10,342 kPa) and sent to a hydrogen peroxide production vessel. The gases may be admitted to the production vessel containing an aqueous working fluid comprising a catalyst, such as palladium, platinum, or a combination thereof. The catalyst facilitates a chemical reaction to combine the hydrogen gas and oxygen gas within the water to form an aqueous solution of hydrogen peroxide. At least some hydrogen gas remains after the reaction, as molar equivalents of hydrogen gas and oxygen gas are required to produce hydrogen peroxide, and the dissociation of water may have produced as much as twice as much hydrogen gas than what is required by the production of hydrogen peroxide. In certain embodiments, the remaining hydrogen gas may be stored, or may be used in a boiler detonation soot blowing process or to provide a hydrogen atmosphere for operation of at least one electrical generator within the fossil fuel fired power plant, discussed in detail below.

A halide promoter, such as bromine, may be added to stabilize the hydrogen peroxide in the aqueous solution. In certain embodiments, the halide promoter may be introduced as bromine gas, or an alternative source of bromide ions. In further embodiments, the source of bromide ions may comprise at least one of hydrogen bromide, a soluble metal bromide, or combinations thereof. In certain embodiments, the soluble metal bromide may comprise at least one of lithium bromide, sodium bromide, potassium bromide, magnesium bromide, or calcium bromide.

In certain embodiments, an aqueous solution containing about 10% to about 20% hydrogen peroxide, and in some embodiments about 15% to about 20% hydrogen peroxide, is created. In certain embodiments, the aqueous solution may be further concentrated, if necessary, by removing at least a portion of the water from the aqueous solution. Removal of at least a portion of the water may be accomplished by exposing the aqueous solution of hydrogen peroxide to waste steam generated by the fossil fuel fired power plant in order to evaporate at least some water present in the aqueous solution of hydrogen peroxide.

The aqueous solution of hydrogen peroxide is then provided to an air pollution control system. In certain embodiments, the aqueous solution of hydrogen peroxide may be produced at about the same rate at which it is used by the air pollution control system. Air pollution control systems which are associated with fossil fuel fired power plants are required by various regulatory bodies to remove various contaminants and/or pollutants which are present in the exhaust created by burning the fossil fuel used by the power plant. These pollutants include nitrogen oxides ($NO_X$), sulfur oxides ($SO_X$), and mercury (Hg), among others.

Regulations regarding the limits of amounts of these pollutants which may be exhausted to the atmosphere are continuously made to be more stringent, requiring that smaller amounts of pollutants be present in the ultimate exhaust from fossil fuel fired power plants. It is therefore continuously more difficult for operators of fossil fuel fired power plants to justify keeping smaller fossil fuel fired power plants open in the face of the increasing capital investments and operating costs required to meet the ever more stringent regulations.

Air pollution control systems at fossil fuel fired power plants typically comprise an oxidizing reactor system and an absorber system, in order to attempt to eliminate as many contaminants and/or pollutants as possible. Typically, the oxidizing reactor systems are the most expensive portion of the air pollution control system, and have therefore been the focus of research into increasing the efficiency and reducing the costs associated with operating air pollution control systems. One such oxidizing reactor system, without limitation, is the Indigo Technologies LLC (Pittsburgh, Pa.) MAPSystem™ pollution control system.

The MAPSystem pollution control system may be retrofitted into existing fossil fuel fired power plants. It is placed before the filter system, and removes pollutants and agglomerates fine particulates in the exhaust stream. The agglomeration of fine particulates and pre-treatment of dust present in the exhaust stream may substantially increase the efficiency of the filter system.

The MAPSystem process comprises seven steps. Step one comprises injection of an oxidizing reagent, such as an aqueous solution of hydrogen peroxide, via a mixing nozzle at the system's inlet. Step two comprises injection of lime in order to create an alkaline environment within the system and to protect the walls of the reactor from corrosion. Step three comprises injection of a fine water mist in order to cool the gas to a temperature approaching the water dew point, and an acid mist is formed from the $NO_X$ and $SO_X$. Mercury (Hg) is removed in a parallel reaction at this stage. Step four comprises injecting an alkaline sorbent to neutralize the acids and convert the hydrated products of the oxidation processes into salts that can be collected as particulates in a conventional filtration device. Step five, which is optional, comprises agglomerating the fine particulates, so that they can be easily captured by the subsequent filter system. Step six, which is optional, comprises reheating the exhaust stream to reduce corrosion of the system elements. Step seven comprises filtering the agglomerated fine particulates in the filter system, such as by use of an electrostatic precipitator.

At least a portion of the remaining hydrogen gas may be utilized in a boiler detonation cleaning system of the fossil fuel fired power plant. Boiler detonation systems typically comprise, without limitation, a combustion chamber and/or conduit which is engaged with a boiler chamber, which may contain numerous heat transfer conduits. A fuel is provided to the combustion chamber and ignited, causing a shock wave which passes through the boiler chamber, loosening or removing deposits which have accumulated on the surface of the heat transfer conduits within the boiler chamber.

In certain embodiments, boiler detonation systems utilize propane as the source of combustion energy. As discussed above, propane must be supplied to the fossil fuel fired power plant, and must be mixed with pure oxygen in order to ignite. Hydrogen gas produced from the present process therefore represents an improvement over propane for use in boiler detonation cleaning systems, because it is produced as a part of the process of operating the fossil fuel fired power plant, and may use atmospheric oxygen to achieve detonation, therefore reducing costs and simplifying the boiler detonation cleaning system. Because hydrogen gas has such a wide range between its lower explosive limit (LEL) and upper explosive limit (UEL), it does not need pure oxygen to detonate; atmospheric oxygen is sufficient.

At least a portion of the remaining hydrogen gas may be utilized for the hydrogen atmosphere in which the electrical generator(s) of the fossil fuel fired power plant operate. As discussed above, at least a portion of the electrical generator(s) are cooled with hydrogen gas. For at least some currently operating facilities, hydrogen gas for the electrical generators is produced off-site by dissociation of water, and the oxygen gas which is created is discarded. This hydrogen gas production process is therefore expensive and wasteful, and results in the need to ship the hydrogen gas to the fossil fuel fired power plant and store it in large quantities on-site at the fossil fuel fired power plant. Because hydrogen gas is produced as part of the present process, there is a reduced need to store hydrogen gas on-site at the fossil fuel fired power plant, which results in a safer work environment, and the costs associated with operating the fossil fuel fired power plant are reduced.

By using the methods according to the present process, the safety of the fossil fuel fired power plant may be increased, the efficiency of the fossil fuel fired power plant may be increased, and the costs associated with operating the fossil fuel fired power plant may be reduced, perhaps substantially. For these reasons, some small fossil fuel fired power plants may be able to continue operating, whereas without the present process, continuing operations would be impossible in light of the costs associated with implementing facilities to comply with new, more stringent regulations regarding pollutant emissions.

Hydrogen peroxide produced according to the present process may result in a reduction by up to half of the costs associated with utilizing hydrogen peroxide in fossil fuel fired power plants, as compared to conventional fossil fuel fired power plant operations. This is true for numerous reasons. First, when electrical dissociation is used to produce hydrogen gas and oxygen gas from water, the cost of the electricity is reduced because it is produced by the fossil fuel fired power plant with which the electrical dissociation process is associated. Second, the hydrogen peroxide does not need to be shipped, and safety concerns are thereby alleviated while reducing costs, because it is necessary to concentrate hydrogen peroxide in order to cost-effectively ship it, and high concentrations may become explosive. Third, it may not be necessary to store the hydrogen peroxide before use; in certain embodiments, the hydrogen peroxide is produced as it is needed by the air pollution control system. Cost and safety concerns are both alleviated when storage of hydrogen peroxide is reduced or becomes unnecessary. Fourth, producing hydrogen peroxide according to the present process is more efficient than the traditional aquinone process, which results in initial hydrogen peroxide concentrations of about 2-3%, which must then be concentrated, whereas the present process may result in initial hydrogen peroxide concentrations of about 10-20% which may be used directly at such concentrations.

Utilizing the hydrogen gas produced according to the present process also results in increases in efficiency and cost reductions with regard to operation costs of fossil fuel fired power plants. With regard to many fossil fuel fired power plants, but particularly with powder river basin coal fired power plants, ash depositions on the surfaces of the heat transfer conduits in the boiler chamber may cause reductions in the efficiency of the heat transfer process occurring in the boiler chamber. Boiler detonation cleaning systems are the most efficient means to remove ash from the exterior surface of heat transfer tubes. Because utilizing hydrogen gas produced according to the present process may be much more efficient than utilizing other fuels, boiler detonation cleaning systems using the hydrogen gas may result in significant increases in the overall efficiency of the fossil fuel fired power plant.

Further, by producing hydrogen gas according to the preset process, it is unnecessary to purchase hydrogen gas, have it shipped to the fossil fuel fired power plant, and store it in large quantities on-site at the fossil fuel fired power plant. Therefore, safety concerns are alleviated because large quantities of the explosive hydrogen gas need not be shipped to or stored in large quantities at the fossil fuel fired power plant. These benefits of hydrogen gas produced according to the present process may also result in drastic reductions in operating costs of the fossil fuel fired power plant.

An integrated process is therefore provided for operating a fossil fuel fired power plant, the process comprising: producing hydrogen gas and an aqueous solution of hydrogen peroxide via a process comprising: dissociating hydrogen gas and oxygen gas from water; pressurizing the hydrogen gas and the oxygen gas; and mixing, under pressure, the oxygen gas and at least about a stoichiometric portion of the hydrogen gas with an aqueous solution of a catalyst and a promoter to form the aqueous solution of hydrogen peroxide; supplying a remainder of the hydrogen gas to at least one of (a) a storage means, (b) a boiler detonation cleaning system of the fossil fuel fired power plant, and (c) an electrical generator of the fossil fuel fired power plant; and injecting the aqueous solution of hydrogen peroxide into an air pollution control system of the fossil fuel fired power plant.

The above embodiment may further comprise concentrating the aqueous solution of hydrogen peroxide prior to said injecting the aqueous solution of hydrogen peroxide into the air pollution control system of the fossil fuel fired power plant. Concentrating the aqueous solution of hydrogen peroxide may comprise exposing the aqueous solution of hydrogen peroxide to waste steam generated by the fossil fuel fired power plant in order to evaporate at least some water present in the aqueous solution of hydrogen peroxide.

Either or both of the above embodiments may further include that supplying the hydrogen gas to the boiler detonation cleaning system of the fossil fuel fired power plant comprises injecting the hydrogen gas into a combustion chamber of the boiler detonation cleaning system and igniting the hydrogen gas to cause a detonation shock wave.

Any or all of the above embodiments may further include that supplying the hydrogen gas to the electrical generator of the fossil fuel fired power plant comprises injecting the hydrogen gas into a sealed chamber in which the electrical generator operates.

Any or all of the above embodiments may further comprise the hydrogen peroxide oxidizing at least one pollutant upon said injecting of the aqueous solution of hydrogen peroxide into the air pollution control system of the fossil fuel fired power plant. The pollutant may comprise at least one of nitrogen oxides, sulfur oxides, or mercury. In addition or in the alternative, oxidation may further comprise removing, via the air pollution control system, at least one oxidized pollutant from an exhaust gas stream of the fossil fuel fired power plant.

Any or all of the above embodiments may further include that the catalyst comprises platinum, palladium, or a combination thereof.

Any or all of the above embodiments may further include that the promoter comprises a halide. In certain embodiments, the promoter may comprise a source of bromide ions, and the source of bromide ions may comprise at least one of bromine gas, hydrogen bromide, a soluble metal bromide, or combinations thereof. The soluble metal bromide may comprise least one of lithium bromide, sodium bromide, potassium bromide, magnesium bromide, or calcium bromide.

Any or all of the above embodiments may further include that the aqueous solution of hydrogen peroxide is produced at about the same rate at which it is used by the air pollution control system.

Any or all of the above embodiments may further include that the aqueous solution of hydrogen peroxide comprises from about 10 to about 20 weight % hydrogen peroxide.

Any or all of the above embodiments may further include that the aqueous solution of hydrogen peroxide comprises from about 15 to about 20 weight % hydrogen peroxide.

Any or all of the above embodiments may further include that dissociating the hydrogen gas and the oxygen gas from water is conducted via electrolysis.

Any or all of the above embodiments may further include that producing hydrogen gas and an aqueous solution of hydrogen peroxide occurs on-site at the fossil fuel fired power plant.

Any or all of the above embodiments may further include that operation of the air pollution control system of the fossil fuel fired power plant comprises: injecting the aqueous solution of hydrogen peroxide into an exhaust stream in the air pollution control system; injecting lime into the exhaust stream in the air pollution control system, such that an alkaline environment is established within the air pollution control system; injecting a fine water mist into the exhaust stream, such that an acid mist is formed from at least one pollutant present in the air pollution controls system; injecting an alkaline sorbent into the exhaust stream such that the acid mist is neutralized and converted into at least one fine particulate salt; optionally agglomerating at least one fine particulate salt within the exhaust stream; optionally reheating the exhaust stream; and filtering at least one fine particulate salt out of the exhaust stream.

Any or all of the above embodiments may further include that filtering at least one fine particulate out of the exhaust stream comprises passing the exhaust stream through an electrostatic precipitator.

FIG. 1 shows a flowchart of one embodiment of the integrated process 10 for operating a fossil fuel fired power plant. Coal 14 enters a coal burning section 16 of a boiler chamber, which also includes a boiler section 20. The coal 14 is burned, exhaust 18 exits the coal burning section 16 and proceeds to an air pollution control system 48. As the coal 14 is burned, water in a coil in boiler section 20 is converted to steam, which proceeds to at least one turbine 22. The steam turns the turbine(s) 22, which is mechanically engaged with at least one electrical generator 28, producing electrical energy 52, which is sent to an electrical grid (not shown). A portion 60 of the electrical energy produced by the electrical generator(s) 28 proceeds to a water dissociation chamber 32, discussed below.

The steam proceeds through the turbine(s) 22 into a condenser 24, such as a shell-and-tube heat exchanger, where it is condensed back into water, and recycled to the coils in the boiling section 20 of the boiler chamber. The condenser 24 acts to transfer heat from the steam to cooling water which is recycled through a cooling tower 26. Heat 54 from the cooling tower 26 is exhausted to the external environment.

Deionized water 12 is used to make-up any water lost during the boiling process, which may be significant. A small portion 30 of the deionized water stream 12 is sent to a water dissociation chamber 32, where the deionized water is dissociated into hydrogen gas and oxygen gas stream 34, optionally via electrolysis powered by a portion 60 of the electrical energy produced by electrical generator(s) 28. Stream 34 proceeds to a hydrogen peroxide production vessel 36 containing an aqueous solution of a catalyst and a promoter. The oxygen gas and at least a stoichiometric portion of the hydrogen gas from stream 34 are mixed under pressure with the aqueous solution of catalyst and promoter. Hydrogen peroxide 46 exits the hydrogen peroxide production vessel 36 and proceeds to the air pollution control system 48, such as a MAPSystem pollution control system. The hydrogen peroxide 46 is injected into the air pollution control system 48 to at least partially clean the exhaust 18 from the coal burning section 16 of the boiler chamber. The cleaned exhaust proceeds to a flue gas stack 50, then to the environment as flue gas 56. Solid waste 58 collected from the air pollution control system 48 may be sent to a proper landfill or recycled, if possible.

In the particular embodiment shown in FIG. 1, excess hydrogen gas 38 proceeds to a hydrogen gas storage tank 40. Hydrogen gas 42 may be supplied from the hydrogen gas storage tank 40 to a boiler detonation cleaning system within the boiling section 20 of the boiler chamber. Hydrogen gas 44 may further be supplied to the generator(s) 28, where it is utilized to create a pure-hydrogen environment in which the generator(s) operates.

The following example illustrates one embodiment of the present disclosure. A 100 $MW_n$ coal fired power plant produces 0.2 lb/MBtu (90.7 g/MBtu) of nitrous oxide (NO), with a heat rate of 10,000 Btu/MW-hr. The coal fired power plant produces 200 lb/hr (90.7 kg/hr) of NO, or $3\times10^3$ moles/hr of NO. The pollution control system of the coal fired power plant will consume 0.9 moles of hydrogen peroxide ($H_2O_2$) per mole of NO. A typical commercial dissociation apparatus consumes 58 kW-hr/kg of hydrogen gas fed into the dissociation apparatus (as part of the deionized water fed to the apparatus), dissipating 20.8 MW-hr/day for producing 4896 kg $H_2O_2$/day. For ease of understanding and calculation, the following calculations assume that the $H_2O_2$ is substantially pure (about 100% concentration).

The oxygen ($O_2$) requirement of the pollution control system of the fossil fuel fired power plant determines the moles of deionized water ($H_2O$) dissociated by the dissociation apparatus to produce $H_2O_2$ and $H_2$. Because 0.9 moles of $O_2$ are required to oxidize each mole of NO, 86.4 kg/hr $O_2$ (0.9 moles of $O_2$/mole NO$\times3\times10^3$ moles NO/hr$\times32$ g/mol) (as part of $H_2O_2$) is provided. This will require 121.5 kg/hr $H_2O$ at 80% selectivity ((2 moles $H_2O$/mole $H_2O_2\times0.9$ moles $H_2O_2$/mole NO$\times3\times10^3$ moles NO/hr$\times18$ g/mol)/0.8). Thus, the pollution control system of the fossil fuel fired power plant will consume 91.8 kg/hr $H_2O_2$ (0.9 moles of $H_2O_2$/mole NO$\times3\times10^3$ moles NO/hr$\times34$ g/mol). The dissociation apparatus produces one mole of hydrogen gas ($H_2$) per mole of $H_2O_2$, which results in a production of 5.4 kg/hr $H_2$ (0.9 moles of $H_2$/mole NO$\times3\times10^3$ moles NO/hr$\times2$ g/mol).

The power consumed to produce 91.8 kg/hr $H_2O_2$ is 18.79 MW-hr/day (58 kW-hr/kg $H_2\times324$ kg $H_2$/day). Assuming the cost of station power is approximately $50/Mw-hr, the power cost per ton of $H_2O_2$ produced according to the embodiments of the present disclosure is approximately $387 ($50/MW-hr$\times18.79$ MW-hr/day$\times907$ kg/ton/2,203 kg $H_2O_2$/day). The amortized capital cost of the installation of the various apparatus of the embodiments of the present disclosure is estimated to be approximately $400/ton $H_2O_2$ and the increase in overhead due to the various apparatus is estimated to be approximately $100/ton $H_2O_2$. Therefore, the total cost of producing the $H_2O_2$ on site at the fossil fuel fired power plant is approximately $887/ton $H_2O_2$.

The cost of $H_2O_2$ produced off site and shipped to the fossil fuel fired power plant is currently estimated at $1,200/ton $H_2O_2$, a cost which is lower than normal due to the current economic climate. Therefore, producing $H_2O_2$ on site at the fossil fuel fired power plant saves approximately $313/ton $H_2O_2$ ($1200-4887). Further, the cost of supplying hydrogen gas to the fossil fuel fired power plant would be approximately $300/day ((0.80 Selectivity$\times5.4$ kg/hr$\times24$ hr$\times58$ kW-hr/kg $H_2\times$50/MW-hr)/(1000 kW-hr/MW-hr), assuming the production rates of hydrogen gas discussed above are the same as the rates of usage in the fossil fuel fired power plant.

In this example, however, the cost (based on the electrical power used to produce the hydrogen gas) has been allocated 100% to the cost of the production of $H_2O_2$. As about 2.4 tons of $H_2O_2$ are produced and used per day, as discussed above, this results in a cost savings for hydrogen gas of approximately $124/ton $H_2O_2$. Therefore, assuming that the fossil fuel fired power plant operates at an average of 80% capacity over the course of a year, requiring 1,463 tons of $H_2O_2$, the cost savings associated with a 100 MWn fossil fuel fired power plant would be approximately $639,000 (($313+$124)×1,463). Such cost savings would be substantial for a small fossil fuel fired power plant, and may allow the fossil fuel fired power plant to continue operating in the face of ever-increasing emission standards.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

I claim:

1. An integrated process for operating a fossil fuel fired power plant comprising:
    producing hydrogen gas and an aqueous solution of hydrogen peroxide via a process comprising:
        dissociating hydrogen gas and oxygen gas from water;
        pressurizing the hydrogen gas and the oxygen gas; and
        mixing, under pressure, the oxygen gas and at least about a stoichiometric portion of the hydrogen gas with an aqueous solution of a catalyst and a promoter to form the aqueous solution of hydrogen peroxide;
    supplying a remainder of the hydrogen gas to at least one of (a) a storage means, (b) a boiler detonation cleaning system of the fossil fuel fired power plant, and (c) an electrical generator of the fossil fuel fired power plant; and
    injecting the aqueous solution of hydrogen peroxide into an air pollution control system of the fossil fuel fired power plant.

2. The process of claim 1, further comprising concentrating the aqueous solution of hydrogen peroxide prior to said injecting the aqueous solution of hydrogen peroxide into the air pollution control system of the fossil fuel fired power plant.

3. The process of claim 2, wherein said concentrating the aqueous solution of hydrogen peroxide comprises exposing the aqueous solution of hydrogen peroxide to waste steam generated by the fossil fuel fired power plant in order to evaporate at least some water present in the aqueous solution of hydrogen peroxide.

4. The process of claim 1, wherein said supplying the hydrogen gas to the boiler detonation cleaning system of the fossil fuel fired power plant comprises injecting the hydrogen gas into a combustion chamber of the boiler detonation cleaning system and igniting the hydrogen gas to cause a detonation shock wave.

5. The process of claim 1, wherein said supplying the hydrogen gas to the electrical generator of the fossil fuel fired power plant comprises injecting the hydrogen gas into a sealed chamber in which the electrical generator operates.

6. The process of claim 1, further comprising the hydrogen peroxide oxidizing at least one pollutant upon said injecting of the aqueous solution of hydrogen peroxide into the air pollution control system of the fossil fuel fired power plant.

7. The process of claim 6, wherein the pollutant comprises at least one of nitrogen oxides, sulfur oxides, or mercury.

8. The process of claim 6, further comprising removing, via the air pollution control system, at least one oxidized pollutant from an exhaust gas stream of the fossil fuel fired power plant.

9. The process of claim 1, wherein the catalyst comprises platinum, palladium, or a combination thereof.

10. The process of claim 1, wherein the promoter comprises a halide.

11. The process of claim 10, wherein the promoter comprises a source of bromide ions.

12. The process of claim 11, wherein the source of bromide ions comprises at least one of bromine gas, hydrogen bromide, a soluble metal bromide, or combinations thereof.

13. The process of claim 12, wherein the soluble metal bromide comprises at least one of lithium bromide, sodium bromide, potassium bromide, magnesium bromide, or calcium bromide.

14. The process of claim 1, wherein the aqueous solution of hydrogen peroxide is produced at about the same rate at which it is used by the air pollution control system.

15. The process of claim 1, wherein the aqueous solution of hydrogen peroxide comprises from about 10 to about 20 weight % hydrogen peroxide.

16. The process of claim 1, wherein the aqueous solution of hydrogen peroxide comprises from about 15 to about 20 weight % hydrogen peroxide.

17. The process of claim 1, wherein said dissociating the hydrogen gas and the oxygen gas from water is conducted via electrolysis.

18. The process of claim 1, wherein said producing hydrogen gas and an aqueous solution of hydrogen peroxide occurs on-site at the fossil fuel fired power plant.

19. The process of claim 1, wherein operating the air pollution control system of the fossil fuel fired power plant comprises:
    injecting the aqueous solution of hydrogen peroxide into an exhaust stream in the air pollution control system;
    injecting lime into the exhaust stream in the air pollution control system, such that an alkaline environment is established within the air pollution control system;
    injecting a fine water mist into the exhaust stream, such that an acid mist is formed from at least one pollutant present in the air pollution controls system;
    injecting an alkaline sorbent into the exhaust stream such that the acid mist is neutralized and converted into at least one fine particulate salt;
    optionally agglomerating the at least one fine particulate salt within the exhaust stream;
    optionally reheating the exhaust stream; and
    filtering the at least one fine particulate salt out of the exhaust stream.

20. The process of claim 19, wherein filtering the at least one fine particulate out of the exhaust stream comprises passing the exhaust stream through an electrostatic precipitator.

* * * * *